(12) United States Patent
Kawamura et al.

(10) Patent No.: US 7,954,932 B2
(45) Date of Patent: Jun. 7, 2011

(54) MOVEMENT APPARATUS AND IMAGE RECORDING APPARATUS

(75) Inventors: Hiroki Kawamura, Nisshin (JP); Shuichi Tamaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 101 days.

(21) Appl. No.: 12/345,562

(22) Filed: Dec. 29, 2008

(65) Prior Publication Data

US 2009/0167825 A1 Jul. 2, 2009

(30) Foreign Application Priority Data

Dec. 28, 2007 (JP) ................................. 2007-340675

(51) Int. Cl.
*B41J 2/14* (2006.01)
(52) U.S. Cl. ......................................................... 347/85
(58) Field of Classification Search ........................ None
See application file for complete search history.

(56) References Cited

U.S. PATENT DOCUMENTS

| 3,756,530 | A | * | 9/1973 | Ito et al. | 242/118.2 |
| 4,002,230 | A | * | 1/1977 | Schweppe et al. | 347/21 |
| 6,493,937 | B1 | * | 12/2002 | Axtell et al. | 29/890.1 |
| 2007/0146445 | A1 | | 6/2007 | Nukui et al. | |
| 2007/0252875 | A1 | * | 11/2007 | Samoto et al. | 347/85 |

FOREIGN PATENT DOCUMENTS

| JP | 2007-118240 A | 5/2007 |
| JP | 2007-176020 A | 7/2007 |

* cited by examiner

Primary Examiner — Matthew Luu
Assistant Examiner — Alejandro Valencia
(74) Attorney, Agent, or Firm — Baker Botts L.L.P.

(57) ABSTRACT

There is disclosed a movement apparatus including a movable body, a flexible long member, a support member, and a tubular member. The movable body reciprocates along a straight line. The long member has having two opposite ends a first one of which is fixed to the movable body and a second one of which is fixed to a stationary member. The form of the long member changes in accordance with a reciprocating movement of the movable body along the straight line and relative to the stationary member. The support member has a linear material portion at which the support member supports the long member. The tubular member is fitted on the linear material portion.

19 Claims, 11 Drawing Sheets

MOVEMENT APPARATUS AND IMAGE RECORDING APPARATUS

CROSS REFERENCE TO RELATED APPLICATION

The present application claims priority from Japanese Patent Application No. 2007-340675, which was filed on Dec. 28, 2007, the disclosure of which is herein incorporated by reference in its entirety.

BACKGROUND OF THE INVENTION

1. Field of the Invention

The present invention relates to a movement apparatus including a movable body reciprocating in a direction, a long member following the movable body, and a support member supporting the long member, and to an image recording apparatus.

2. Description of Related Art

As a type of image recording apparatus, there is known an inkjet recording apparatus that ejects droplets of ink based on input signals so as to record an image on a recording medium. In the inkjet recording apparatus, an actuator is disposed in a recording head in which nozzles are formed, and ink is drawn to the actuator, which is selectively and locally pressurized to eject the ink in the form of droplets from the nozzles. For instance, the actuator is constituted by an electrostrictive or piezoelectric element and the ink is pressurized by locally deflecting or deforming the actuator, or alternatively the actuator is constituted by a heating element and the ink is pressurized by locally evaporating the ink.

In an inkjet recording apparatus, the recording head is reciprocated relative to a recording medium, e.g., recording sheet. For instance, the recording head is mounted on a carriage and reciprocated therewith. The carriage receives a driving force from a motor or others and reciprocates in a direction along a guide such as a rod or a rail. While the carriage is reciprocating, the recording head selectively ejects ink droplets onto the recording medium in order that the ink droplets land on the recording medium to form an image to be recorded.

The ink is supplied to the recording head from an ink cartridge or others disposed separately from the recording head. For instance, this is realized by using an ink tube which functions as a passage through which the ink is supplied from the ink cartridge to the recording head. The ink tube has a flexibility such that the form or position or attitude of the ink tube changes in accordance with a reciprocating movement of the carriage, and has a length corresponding to a maximum distance between the carriage and the ink cartridge, i.e., the distance therebetween at the time when the carriage is at its farthest position from the ink cartridge. Hence, when the carriage is at its closest position to the ink cartridge, the ink tube is curved or bent in a substantially U-like shape or otherwise.

How ink droplets are ejected from the recording head, e.g., the timings at which ink droplets are ejected, is based on electrical signals sent from a control board or main board of the image recording apparatus. The electrical signals are transferred between the main board and a head control board, which is a control board for the recording head and is reciprocated together with the recording head. This signal transfer between the main board and the head control board is enabled by an electric cable connecting these boards. Like the ink tube, this electric cable changes its form in accordance with the reciprocating movement of the carriage.

JP-A-2007-118240 discloses a cable holding mechanism used in an inkjet recording apparatus in which a flexible cable is connected with a carriage. The cable holding mechanism includes a cable holder and a cable-holder driving belt coupled with the cable holder. While the carriage is moved or reciprocated, the cable holder is moved by the cable-holder driving belt in accordance with the reciprocating movement of the carriage in order that the flexible cable in a curved or bent state or shape does not slack.

However, the cable holding mechanism including the cable-holder driving belt and a motor or others for driving the cable-holder driving belt is relatively large in size and high in cost. Further, when the cable holder is moved, the motor, the cable-holder driving belt, and others generate operation noise, and frictional contact between the cable holder and the flexible cable causes high-frequency noise, making the overall operation noise of the movement apparatus relatively high. Still further, the frictional contact between the cable holder and the flexible cable leads to wear of the flexible cable, which may result in damage of the flexible cable or electrical disconnection in the flexible cable. In addition, minute particles produced from the worn flexible cable may inhibit the other members than the flexible cable from normally operate.

SUMMARY OF THE INVENTION

This invention has been developed in view of the above-described situations, and an object of the invention is to provide a movement apparatus which includes a movable body, a long member following the movable body, a support member supporting the long member, and a holding device holding the support member, and which alleviates problems caused by frictional contact between at least one of the following pairs: (i) the support member and the long member, and (ii) the support member and the holding device.

To attain the object, the invention provides the following modes (1)-(23) of a movement apparatus and an image recording apparatus.

(1) A movement apparatus including:

a movable body which reciprocates along a straight line;

a flexible long member having two opposite ends a first one of which is fixed to the movable body and a second one of which is fixed to a stationary member, the form of the long member changing in accordance with a reciprocating movement of the movable body relative to the stationary member;

a support member which has a linear material portion at which the support member supports the long member; and a tubular member fitted on the linear material portion.

For instance, the movement apparatus may take the form of a part of a printer in which a recording head is mounted on the movable body, or a part of a scanner in which an image sensor is mounted on the movable body. The movable body receives a driving force from a drive source such as a motor and reciprocates along the straight line. The long member is coupled with the movable body. The long member is a lengthy tubular or band-shaped member. For instance, the long member may be an electric cable for transferring electrical signals, or an ink tube for transferring ink. The first and second ends of the long member are respectively connected with the movable body and the stationary member which may be a main body of an apparatus in which the movement apparatus is installed. A portion of the long member, which is, for instance, a middle portion of the long member between the first and second ends thereof, has a flexibility such that the supported portion changes its form, following the movable body reciprocating, or in accordance with the reciprocating movement of the movable body. The linear material portion included in the support member has a rigidity such that the linear material portion can support the long member. An entirety of the support member may correspond to the linear material portion, that is, an entirety of the support member may be constituted by a linear material. For instance, the linear material portion supports the long member by supporting the middle portion of the long member.

The tubular member is fitted on the linear material portion such that the linear material portion is inserted in a bore of the tubular member. Hence, the axial direction of the linear material portion and that of the tubular member substantially coincide with each other. Since the tubular member is fitted on the linear material portion, the long member is supported by the linear material portion via the tubular member. Thus, the long member does not directly contact the linear material portion while supported by the linear material portion which has a relatively high rigidity. Therefore, it is prevented that the long member is worn as a result of frictional contact between the long member and the linear material portion, and noise caused by the frictional contact is reduced. It is desirable, but is not essential, that the tubular member is rotatable around and relative to the linear material portion as in the mode (2) described below, since the above-described effects can be obtained as long as the tubular member is interposed between the linear material portion and the long member and the linear material portion and the long member are not in direct contact with each other.

The fact that the curvature radius of an outer circumferential surface of the tubular member is larger than that of the linear material portion is assumed to be one reason for that the above-described effects can be obtained even where the tubular member does not rotate around or relative to the linear material portion. However, in order to obtain the effects, namely, reducing the wear of the long member and the noise due to frictional contact between the tubular member and the long member, it is desirable that at least one of the following conditions (i) and (ii) is established: (i) the vibration damping property of a material forming the tubular member is higher than that of a material forming the linear material portion, and (ii) the tubular member less wears the long member than the linear material portion does, for some reasons, which may be that the tubular member is lower in at least one of friction coefficient, hardness, and plane roughness than the linear material portion.

According to the movement apparatus of the mode (1) where the tubular member is fitted on the linear material portion and the long member is supported by the linear material portion via the tubular member, it is enabled to support the long member by the linear material portion having a relatively high rigidity while direct contact between the long member and the linear material portion is prevented. Therefore, problems including at least one of wear of the long member by the linear material portion and friction noise occurring between the long member and the linear material portion, which problems are caused by frictional contact between the long member and the support member, are alleviated.

(2) The movement apparatus according to the mode (1), wherein the linear material portion has a straight portion, and the tubular member is fitted on the straight portion such that the tubular member is rotatable relative to the straight portion.

Where the tubular member is rotatable relative to the straight portion, the tubular member rotates around or relative to the straight portion when the long member moves relative to the tubular member. This decreases slippage between the long member and the tubular member. It is ideal, but not essential, that the rotation of the tubular member relative to the straight portion eliminates the slippage between the tubular member and the long member. Decreasing the slippage by the rotation of the tubular member relative to the straight portion accordingly reduces at least one of the friction noise and the wear of the long member.

(3) The movement apparatus according to the mode (2), wherein the change of the form of the long member in accordance with the reciprocating movement of the movable body is along a plane, the movement apparatus further including a holding device which holds the support member such that the support member can turn around an axis perpendicular to the plane.

(4) The movement apparatus according to the mode (3), wherein the holding device has a supporting portion which supports the linear material portion via the tubular member.

The support member turns while supported by the supporting portion of the holding device. The axis around which the support member turns is desirably at a first end of the linear material portion. That is, the axial direction of the linear material portion desirably coincides with the radius of turn of the support member. The support member turns in accordance with the reciprocating movement of the movable body. For instance, a portion of the support member is coupled with the long member at a place on the long member, thereby making the support member turn in accordance with the change of the form of the long member.

The linear material portion is supported by the supporting portion of the holding device via the tubular member. The tubular member is rotatable around or relative to the linear material portion. The tubular member rotates around the linear material portion. The axis of the tubular member substantially coincides with the axis of the linear material portion. Hence, when the support member turns such that the axial direction of the linear material portion desirably corresponds to the radius of turn of the support member, the tubular member turns together with the linear material portion while rotating on the supporting portion of the holding device. Thus, the linear material portion smoothly turns or moves relative to the supporting portion of the holding device.

(5) The movement apparatus according to the mode (3), wherein the straight portion extends in a direction such that with respect to an entire range of reciprocation of the movable body, irrespective of how the form of the long member changes and how the straight portion turns around the axis when the movable body reciprocates, a slippage between the tubular member and the long member is smaller where the tubular member rotates relative to the straight portion than where the tubular member does not rotate relative to the straight portion.

Although it is ideal that the rotation of the tubular member relative to the straight portion eliminates or prevents the slippage between the long member and the tubular member, it is inevitable that an angle of intersection between the long member and the tubular member changes and the long member and the tubular member move relative to each other with respect to the axial direction of the tubular member, since when the support member turns around the axis, (i) the straight portion accordingly turns around the axis, but a movement of the long member at this time is not a simple turn, and (ii) the place on the long member at which the long member is supported by the straight portion gradually shifts. However, in the arrangement where the straight portion extends in a direction such that the slippage between the long member and the tubular member is small as compared to a case where the tubular member does not rotate relative to or around the straight portion, the above-described effects can be obtained to some degree, and it is desirable that the straight portion extends in a direction such that the slippage between the long member and the tubular member is minimized.

(6) The movement apparatus according to any one of the modes (1)-(5), wherein the linear material portion is formed of a metal, and the tubular member is formed of a synthetic resin.

As the material forming the tubular member is desirably employed a material that less wears the long member and less generates friction noise than metal does when a slippage occurs between the tubular member and the long member. For instance, a synthetic resin is employed as the material forming the tubular member. As the synthetic resin desirably employed as the material forming the tubular member, a soft synthetic resin, e.g., polyethylene or polypropylene, is desirably employed. A tubular member formed of a soft synthetic resin less generates friction noise with the long member.

(7) The movement apparatus according to any one of the modes (1)-(6), wherein there is a cut made from an outer circumferential surface of the tubular member to an inner circumferential surface thereof across an entire length of the tubular member, the cut being openable with an elastic deformation of the tubular member.

If the cut is not made, it is required to insert the linear material portion into the tubular member from one of two open ends of the tubular member. However, according to the mode (7) where the tubular member has the cut, it is possible to insert the linear material portion into tubular member from the cut, thereby facilitating fitting or attachment of the tubular member on the linear material portion. More specifically, with the cut being slightly opened at one of two opposite ends of the tubular member, a part of the linear material portion is pushed into the bore of the tubular member. Then, with the place where the cut is opened is gradually shifted along the direction of extension of the cut, the rest of the linear material portion is sequentially pushed into the bore of the tubular member along its axial direction. When a part of the linear material portion has been inserted in a portion of the tubular member through the cut, the portion of the tubular member elastically restores to its original form. The feature of the mode (7) is particularly significant where the support member has two portions on the axially opposite sides of the linear material portion and each of the two portions is angled with respect to the linear material portion.

(8) The movement apparatus according to any one of the modes (1)-(7), wherein the tubular member is formed of a material having a translucency.

According to the mode (8) where the tubular member has a translucency, the inside of the tubular member is seeable through a wall of the tubular member. In the tubular member, the photorefractive index differs at cut surfaces of the cut from the other part of the tubular member, and thus the cut surface is seen as clouded. Hence, it is easy to find the cut surface.

(9) The movement apparatus according to the mode (7), wherein the tubular member is formed of a material having a translucency, and at least one of two opposite cut surfaces of the cut is colored differently from the other part of the tubular member.

According to the mode (9) where coloring at least one of the two opposite surfaces forming the cut is seeable in the tubular member having a translucency, the cut can be easily found.

(10) The movement apparatus according to any one of the modes (1)-(9), wherein the linear material portion has a bent shape such that the linear material portion supports the long member at a plurality of places on the linear material portion.

Where the long member is relatively long and supported at a single place by the linear material portion, the long member may slack at a place not supported. Hence, where the long member is relatively long, it is preferable to support the long member at a plurality of places. By bending the linear material portion, it is enabled to support the long member by a single linear material at a plurality of places. As a method for bending the linear material, wire forming may be employed, for instance. Typically, after subjected to wire forming, a linear material, or a wire, is subjected to a heat treatment so as to maintain the shape obtained as a result of the wire forming. Where the tubular member is formed of a synthetic resin, it is preferable to attach the tubular member on the linear material or the linear material portion, after the heat treatment is performed on the linear material having been subjected to the wire forming, in view of the heat resistance of the tubular member. As described above, the cut made in the tubular member facilitates attaching of the tubular member at a desired position in the linear material portion bent.

(11) The movement apparatus according to the mode (2), wherein in addition to the straight portion as a first straight portion, the support member has a second straight portion, the movement apparatus further including a second tubular member fitted on the second straight portion such that the second tubular member is rotatable relative to the second straight portion, and the first tubular member and the second tubular member being discrete members.

The feature of any one of the modes (4)-(9) is applicable to the second tubular member.

(12) The movement apparatus according to the mode (11), wherein the change of the form of the long member in accordance with the reciprocating movement of the movable body is along a plane, the movement apparatus further including a holding device which holds the support member such that the support member can turn around an axis perpendicular to the plane.

(13) The movement apparatus according to the mode (12), wherein the holding device comprises a base member which supports the second straight portion via the second tubular member.

(14) The movement apparatus according to the mode (13), wherein the base member has a support rib which is formed along an arc having a center at the axis around which the support member turns, the support rib supporting the second straight portion via the second tubular member.

(15) The movement apparatus according to the mode (3) or (12), wherein the holding device holds the support member by contacting the support member at least three places thereon which are not located on a straight line.

The support member turns while supported by a supporting portion of the holding device. When the long member moves on the linear material portion of the support member, the direction of the torque acting on the support member may change during the turn of the support member. Since the holding device holds the support member by contacting the support member at least three places which are not located on a straight line, the support member can stably maintain its position or attitude even when the direction of the torque changes with the movement of the long member. Hence, the attitude of the support member is not affected by the dimensional accuracy and a thermal deformation or deformation with the passage of time of the support member, whereby the noise due to the turning of the support member is reduced.

(16) The movement apparatus according to the mode (3) or (12), wherein the support member has a pivotal portion and two arm portions, the pivotal portion having a center axis at the axis around which the support member turns, and the two arm portions respectively extending from two axial ends of the pivotal portion in respective directions that intersect the center axis and are opposite to each other in a second plane including the center axis and being perpendicular to a first plane which is the plane along which the change of the form of the long member in accordance with the reciprocating movement of the movable body occurs, and wherein the holding device has a pivot hole for holding the pivotal portion of the support member such that the pivotal portion is rotatable, the holding device supporting the two arms one from the under side and the other from the upper side and including a base member which supports from the under side a portion of the support member which is located away from the second plane.

(17) The movement apparatus according to any one of the modes (1)-(16), wherein the movable body comprises a carriage holding a recording head and moving with the recording head, and the long member comprises at least one of (i) an electric cable through which a signal representative of an instruction on recording is sent to the recording head, and (ii) an ink tube through which ink is supplied to the recording head.

(18) The movement apparatus according to the mode (17), wherein the support member has a tube holding portion which holds the ink tube such that the tube holding portion surrounds a part of the ink tube and allows a movement of the ink tube in an axial direction of the ink tube, the support member turning around the axis in accordance with a change of the form of the ink tube in accordance with the reciprocating movement of the movable body.

(19) The movement apparatus according to the mode (18), wherein the long member is the electric cable.

(20) An image recording apparatus including:

the movement apparatus according to any one of the modes (17)-(19); and a medium feeding device which feeds a recording medium in a direction perpendicular to the direction of the reciprocation of the movable body, the image recording apparatus having the recording head eject droplets of the ink onto the recording medium in order to record an image on the recording medium.

(21) A movement apparatus including:

a movable body which reciprocates along a straight line;

a flexible long member having two opposite ends a first one of which is fixed to the movable body and a second one of which is fixed to a stationary member, the form of the long member changing in accordance with a reciprocating movement of the movable body relative to the stationary member;

a support member which has a linear material portion;

a tubular member fitted on the linear material portion; and a holding device which holds the support member such that the support member can turn around an axis, the holding device supporting the linear material portion via the tubular member.

The feature of any one of the modes (4)-(9) is applicable to the tubular member of the mode (21).

(22) The movement apparatus according to the mode (21), wherein the linear material portion has a straight portion, and the tubular member is fitted on the straight portion such that the tubular member is rotatable relative to the straight portion, and wherein the holding device includes a support rib which is formed along an arc having a center at the axis around which the support member turns, the support rib supporting the straight portion via the tubular member.

(23) The movement apparatus according to the mode (21) or (22), wherein the long member is supported by the linear material portion via the tubular member.

BRIEF DESCRIPTION OF THE DRAWINGS

The above and other objects, features, advantages and technical and industrial significance of the present invention will be better understood by reading the following detailed description of one preferred embodiment of the invention, when considered in connection with the accompanying drawings, in which.

DETAILED DESCRIPTION OF PREFERRED EMBODIMENT

Hereinafter, there will be described one presently preferred embodiment of the invention that takes the form of a multifunction apparatus, by referring to the accompanying drawings.

General Structure of Multifunction Apparatus 10

Figure 1:
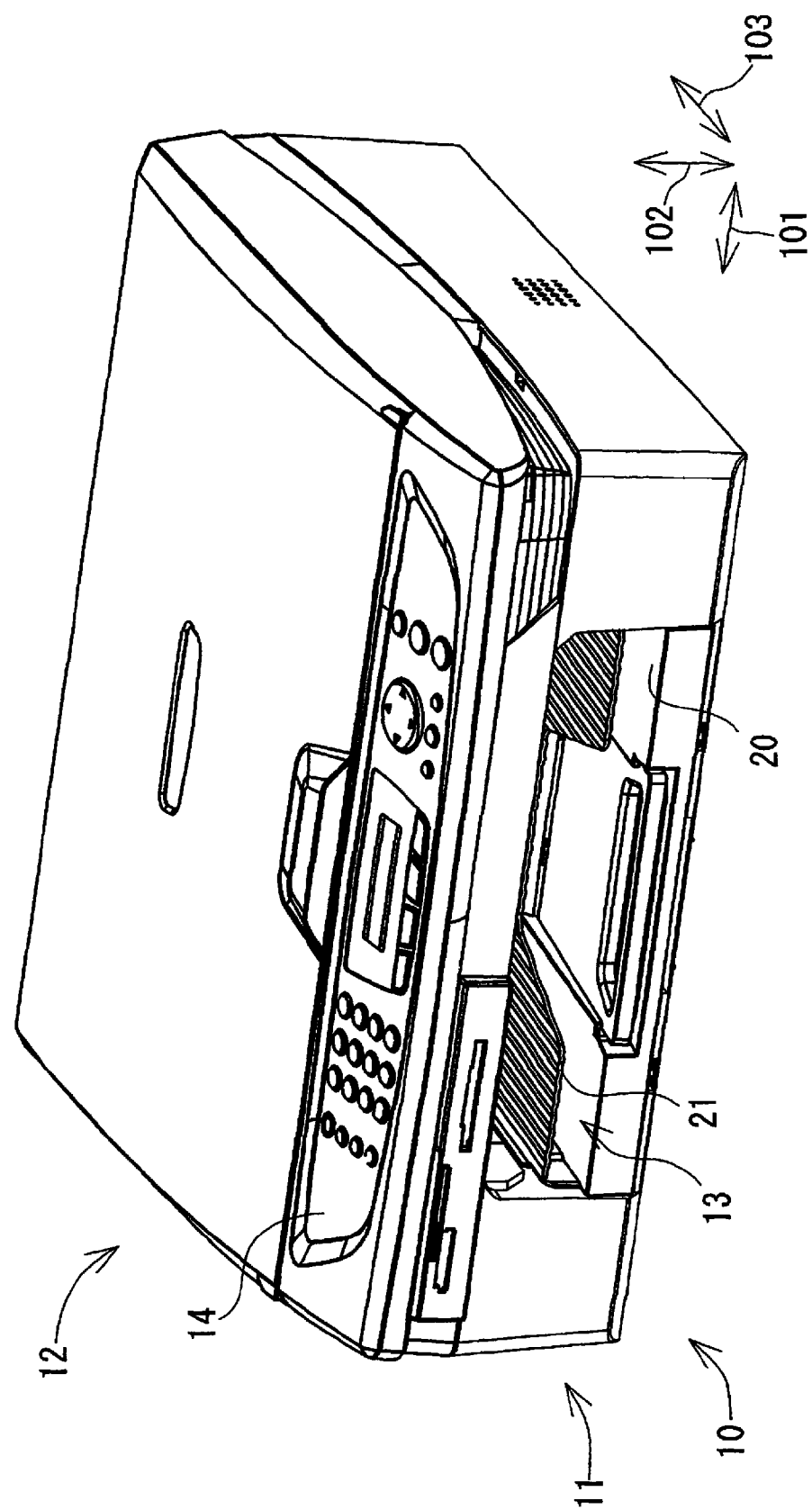
FIG. 1 is an external perspective view of a multifunction apparatus according to one embodiment of the invention.
Figure 2:
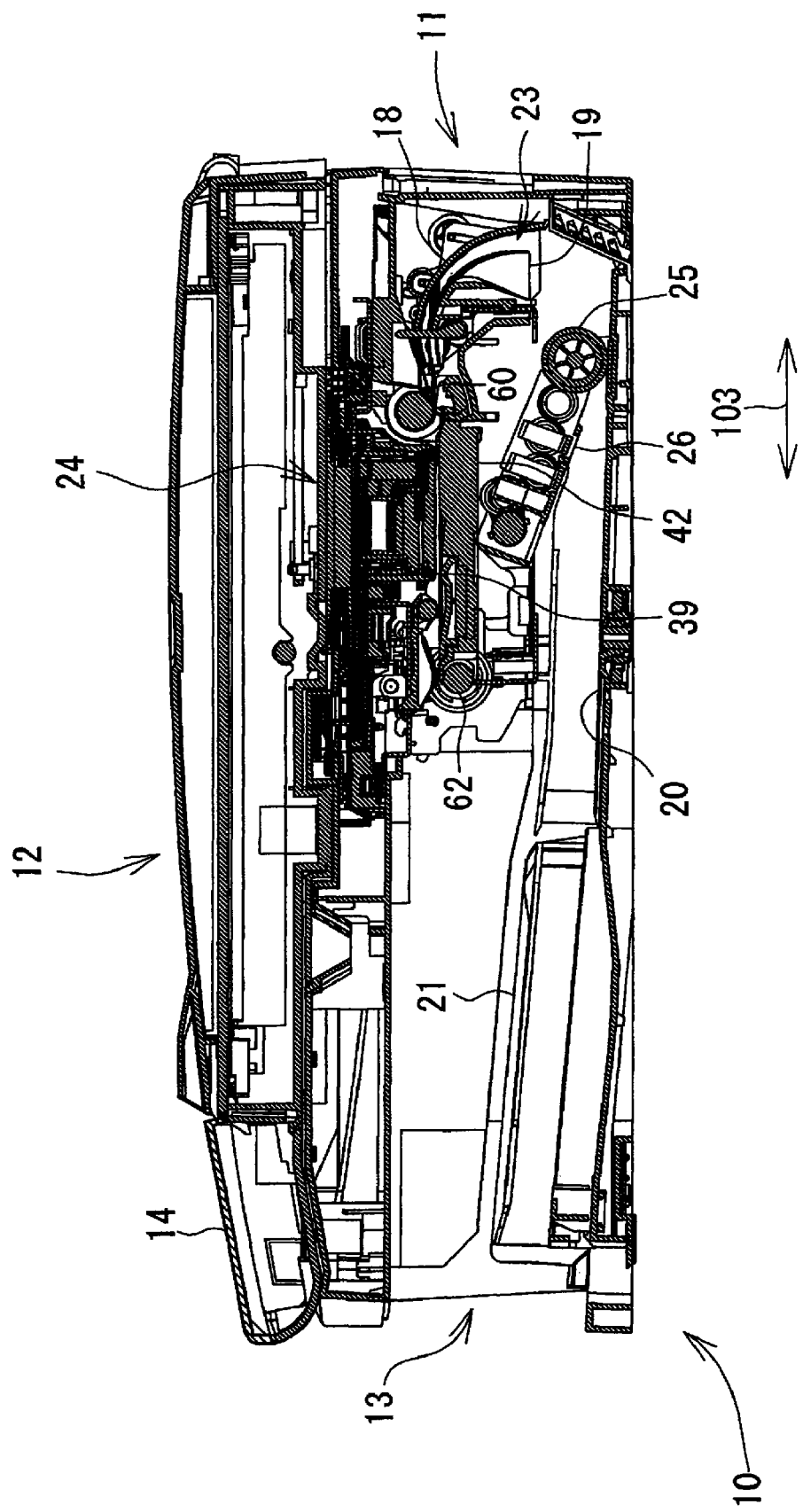
FIG. 2 is a vertical cross-sectional view of the multifunction apparatus and shows an internal structure of the multifunction apparatus.

As shown in FIGS. 1 and 2, the multifunction apparatus 10 integrally includes a printer portion 11 and an image scanner portion 12, and has a printer function, an image scanner function, a copier function, and a facsimile function. The printer portion 11 corresponds to an image recording apparatus of the invention. It is noted that the other functions provided by the printer portion 11 other than the printer function are optional. That is, the image recording apparatus according to the invention may take the form of a printer of single function that does not have an image scanner function and a copier function, i.e., that does not include the image scanner portion 12. As described later, a movement apparatus of the invention is incorporated in the printer portion 11.

The printer portion 11 and the image scanner portion 12 respectively constitute a lower portion and an upper portion of the multifunction apparatus 10. The printer portion 11 is connected with an external information apparatus which may typically be a computer. The printer portion 11 receives print data from the external information apparatus. The print data includes image data and document data. Based on the print data, the printer portion 11 records an image and letters or characters on a recording sheet as a recording medium. The image scanner portion 12 is constituted by a flatbed scanner.

The multifunction apparatus 10 generally has the shape of a flat, rectangular parallelepiped. That is, a height of the multifunction apparatus 10 (i.e., the dimension in the direction of arrow 102) is smaller than a width and a depth thereof (i.e., the dimensions in the directions of arrows 101, 103, respectively). At the front side of the printer portion 11 is formed an opening 13, in which a medium supply tray 20 and a catch tray 21 are disposed. The medium supply tray 20 accommodates recording sheets, which are one by one fed to the inside of the printer portion 11 so that a desired image is recorded on each recording sheet. The recording sheet on which an image has been recorded is ejected onto the catch tray 21.

In a front upper portion of the multifunction apparatus 10, an operation panel 14 is disposed. Through the operation panel 14 is inputted an instruction so as to operate the printer portion 11 or the image scanner portion 12 as desired. The operation panel 14 includes a plurality of buttons for allowing input of an instruction and a display for presenting information, such as that related to the status of the multifunction apparatus 10 or an error. When the multifunction apparatus 10 is connected with an external information apparatus, the instruction based on which the multifunction apparatus 10 is operated may be received from the external information apparatus through communication software such as a printer driver or a scanner driver.

Printer Portion 11

As shown in FIG. 2, the medium supply tray 20 is disposed at the bottom of the multifunction apparatus 10, and the catch tray 21 is disposed over the medium supply tray 20. A feed path 23 along which each recording sheet is fed extends from the medium supply tray 20 to the catch tray 21. A recording sheet fed out from the medium supply tray 20 is upward guided to an image recording unit 24 along the feed path 23 in a U-turn manner. At the recording unit, image recording is performed on the recording sheet. Then the recording sheet is ejected onto the catch tray 21.

The medium supply tray 20 has the shape of a container open on the upper side, and can accommodate a stack of recording sheets as recording media. The medium supply tray 20 can accommodate recording sheets of various sizes including A3 and smaller sizes including A4, B5, and postcard size.

The catch tray 21 has the shape of a tray. The recording sheets are ejected onto an upper surface of the catch tray 21. The catch tray 21 is disposed at the front side of the multifunction apparatus 10 such that the catch tray 21 does not extend over the medium supply tray 20 at the rearmost portion in the multifunction apparatus 10.

At a position corresponding to a rear end portion of the medium supply tray 20, a pickup roller 25 is disposed. The pickup roller 25 operates to supply the recording sheets on the medium supply tray 20 one by one into the feed path 23. The pickup roller 25 is driven by a motor not shown, and is rotatably held at a distal end of a medium supply arm 26, which can swing around an axis, thereby making the pickup roller 25 vertically movable to and away from the medium supply tray 20. The medium supply arm 26 is downward biased by the weight of the pickup roller 25 or by a spring so that the pickup roller 25 is held in contact with the topmost one of the recording sheets stacked on the medium supply tray 20 and the pickup roller 25 moves upward with increase in the thickness of the stack of the recording sheets. When the pickup roller 25 is rotated in this state, the topmost recording sheet is fed out into the feed path 23 by frictional contact between an outer circumferential surface of the pickup roller 25 and the topmost recording sheet.

The feed path 23 extends upward from the rear side of the medium supply tray 20 and then curves frontward to the catch tray 21 via the image recording unit 24. Except at a place where the image recording unit 24 and others are disposed, the feed path 23 is defined between an outer guide surface and an inner guide surface that are opposed to each other with a clearance therebetween. For instance, a curving portion of the feed path 23 in a rear portion of the printer portion 11 is defined between an outer guide member 18 and an inner guide member 19 that may be fixed to a frame of the printer portion 11 or others.

The image recording unit 24 is mainly constituted by a recording head 39 and a platen 42 that are opposed to each other with a gap therebetween. The image recording unit 24 will be described in detail later.

On the upstream side of the image recording unit 24 with respect to the direction of feeding of recording sheet along the feed path 23 (hereinafter referred to as "the feeding direction"), a pair of rollers, namely, a feeder roller 60 and a pinch roller, are disposed. Although in FIG. 2 the pinch roller is behind other members and not shown, the pinch roller is disposed under the feeder roller 60 in pressing contact therewith. The feeder roller 60 is driven by a motor not shown. The feeder roller 60 and the pinch roller nip therebetween a recording sheet being fed along the feed path 23 and feed the recording sheet to a position over the platen 42.

On the downstream side of the image recording unit 24 with respect to the feeding direction, a pair of rollers, namely, an ejection roller 62 and a gear roller, are disposed. Although in FIG. 2 the gear roller is behind other members and not shown, the gear roller is disposed over the ejection roller 62 in pressing contact therewith. The ejection roller 62 is driven by receiving a driving force from a motor (not shown). The ejection roller 62 and the gear roller nip therebetween a recording sheet on which an image has been recorded, to feed and eject the recording sheet onto the catch tray 21. The feeder roller 60, the pinch roller, the ejection roller 62, and the gear roller, and devices driving these rollers cooperate to constitute a medium feeding device 64 that feeds a recording sheet as a recording medium in a direction perpendicular to the direction of the reciprocation of the carriage 38 as a movable body.

General Structure of the Image Recording Unit 24

The movement apparatus of the invention is realized as a combination of a carriage 38, a flat cable 85, and a guide wire 80 in the image recording unit 24. The carriage 38, the flat cable 85, and the guide wire 80 respectively correspond to a movable body, a long member, and a support member of the invention. It is noted that the guide wire 80 is not shown in FIGS. 3, 10 and 11, and the flat cable is not shown in FIGS. 6 and 7.

Figure 3:
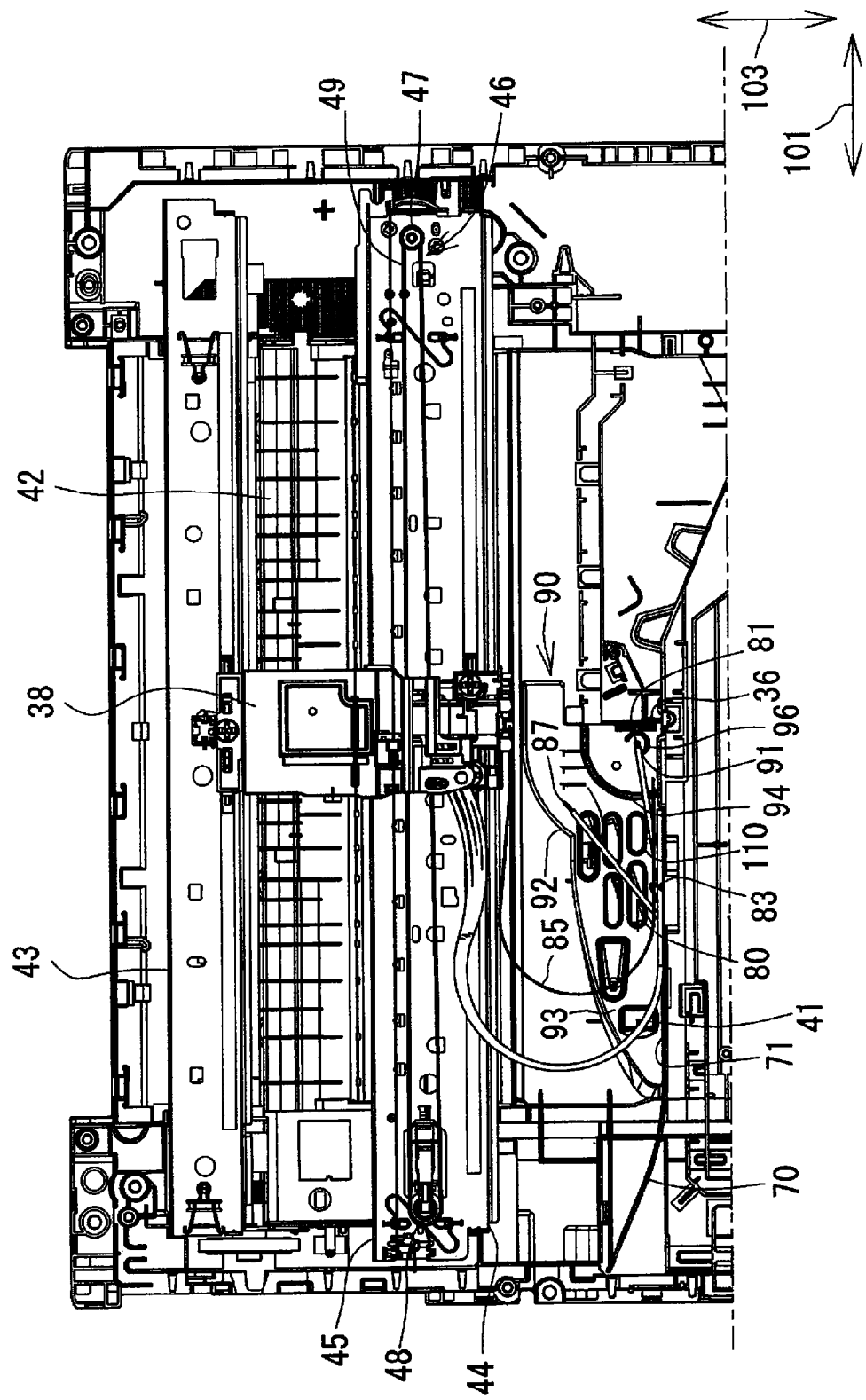
FIG. 3 is a plan view showing an image recording unit of the multifunction apparatus and its vicinity.

Although not shown in FIG. 3, the carriage 38 holds the recording head 39 which is of inkjet type. To the recording head 39 are supplied four color inks, namely, cyan, magenta, yellow and black inks, from respective ink cartridges disposed in the multifunction apparatus 10 independently of, or separately from, the recording head 39, through ink tubes 41. It is noted that the ink tubes 41 are not shown in FIGS. 6 and 7. While the carriage 38 is reciprocated, the inks are selectively ejected in the form of minute droplets from the recording head 39, whereby an image is recorded on a recording sheet being fed over the platen 42. In FIG. 3, the ink cartridges containing the inks are not shown.

Figure 4:
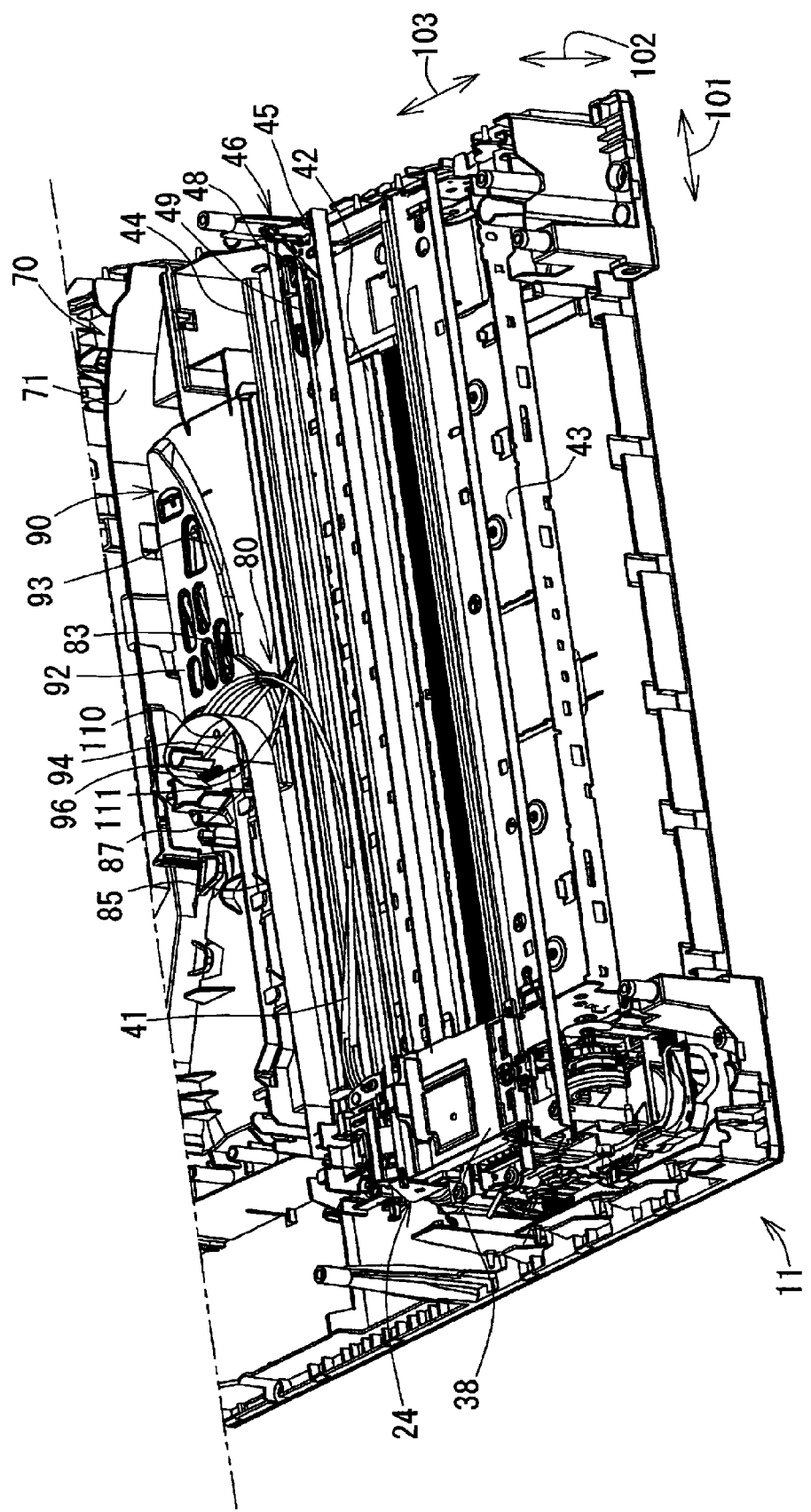
FIG. 4 is a perspective view of the image recording unit and its vicinity.

As shown in FIGS. 3 and 4, on the vertically upper side of the feed path 23, a pair of guide rails 43, 44 extend in a direction intersecting the feeding direction, that is, extend in the lateral direction as seen in FIG. 3 and indicated by arrow 101. The guide rails 43, 44 are spaced from each other in the feeding direction which is from the upper side to the lower side as seen in FIG. 3. The guide rails 43, 44 are disposed in a housing of the printer portion 11, and constitute a part of the frame that supports members constituting the printer portion 11. The carriage 38 is disposed across the guide rails 43, 44 such that the carriage 38 is slidable in the direction of extension of the guide rails 43, 44, i.e., the lateral direction as seen in FIG. 3 and the direction indicated by arrow 101.

One 45 of two opposite edge portions of the guide rail 44 on the upstream side with respect to the feeding direction is bent substantially upright. The carriage 38 supported on the guide rails 43, 44 holds the edge portion 45 by means of a holding member such as a roller pair such that the carriage 38 is slidable. Thus, the carriage 38 is positioned with respect to the feeding direction which is from the upper side to the lower side as seen in FIG. 3, and is slidable in a direction intersecting the feeding direction which is perpendicular to the feeding direction in this specific example. That is, the carriage 38 is slidably supported on the guide rails 43, 44, and reciprocated along the edge portion 45 of the guide rail 44 in the direction intersecting the feeding direction.

On an upper surface of the guide rail 44, a belt drive mechanism 46 is disposed. The belt drive mechanism 46 is constituted by a drive pulley 47, a driven pulley 48, and a timing belt 49. The drive and driven pulleys 47, 48 are respectively disposed near two opposite ends of the feed path 23 in the width direction thereof, i.e., the direction indicated by arrow 101. The timing belt 49 is an endless belt wound around the drive and driven pulleys 47, 48 and has teeth on its inner surface. To a shaft of the drive pulley 47, a driving force of a motor (not shown) is inputted. By rotation of the drive pulley 47, the timing belt 49 is circulated.

Although not shown in FIGS. 3 and 4, the carriage 38 is coupled at the bottom thereof with the timing belt 49. When the timing belt 49 is circulated, the carriage 38 is reciprocated on the guide rails 43, 44 along the edge portion 45. The recording head 39 mounted on the carriage 38 reciprocates with the carriage 38 in the width direction of the feed path 23, i.e., the direction of arrow 101.

On the lower side of the feed path 23, the platen 42 is disposed to be opposed to the recording head 39. Within the range of reciprocation of the carriage 38, the platen 42 extends across a central area where a recording sheet passes. The width of the platen 42 is larger by a sufficient amount than that of the widest recording sheet of all the kinds of recording sheets usable in the printer portion 11. The distance between the recording head 39 and the recording sheet as supported on an upper surface of the platen 42 is held constant. Ink droplets ejected from the recording head 39 land on the recording sheet in this state.

Ink Tubes 41

Although not shown in FIGS. 3 and 4, the ink cartridges containing the inks are mounted on a cartridge mounting portion in the printer portion 11. From the cartridge mounting portion, four ink tubes 41 corresponding to the respective color inks extend to the carriage 38. The inks supplied via the ink tubes 41 to the carriage 38 are introduced into the recording head 39 mounted on the carriage 38.

Each of the ink tubes 41 is formed of synthetic resin in a straight shape. The ink tube 41 has an appropriate flexibility or flexural rigidity such that the ink tube 41 maintains the straight shape but bends or deforms when receiving an external force, and a resiliency to restore to its original shape when the external force is removed. The ink tube 41 with the flexibility and resiliency changes its form or position or attitude, following the carriage 38 moving or reciprocating, or in accordance with a reciprocating movement of the carriage 38.

The ink tubes 41 extending from the cartridge mounting portion are fixed in position at and by a clip 36 disposed in a main body 37 of the printer portion 11. A portion of each ink tube 41 between the carriage 38 and the clip 36 is not fixed to any members in the printer portion 11 including the main body 37 thereof, and can freely bend or deform. This portion of the ink tube 41 changes its form or position or attitude, following a reciprocating movement of the carriage 38. In FIGS. 3 and 4, the ink tubes 41 are imaginarily cut between the clip 36 and the cartridge mounting portion (not shown), and a portion of the ink tube 41 on the side of the cartridge mounting portion is not shown, for convenience of illustration.

Each of the ink tube 41 extends such that its portion between the clip 36 and the carriage 38 is bent in a substantially U-like shape having two parallel portions extending in the direction of reciprocation of the carriage 38. By the clip 36, the four ink tubes 41 are fixed such that the ink tubes 41 are arranged in a vertical direction that is perpendicular to a plane of the sheet in which FIG. 3 is presented, i.e., in the direction of arrow 102 in FIG. 1. On the other hand, on the side of the carriage 38, the four ink tubes 41 are arranged horizontally. That is, the four ink tubes 41 are twisted such that the direction of their arrangement changes from horizontal to vertical in a direction from the carriage 38 to the clip 36 while each of the ink tubes 41 is curved into a substantially U-like shape as a whole as seen in plan view of FIG. 3.

Flat Cable 85

As shown in FIGS. 3 and 4, the flat cable 85 is fixed at and by the clip 36 and extends to the carriage 38. The flat cable 85 is an electric cable through which electrical signals are transferred between a control board or a main board (not shown) of the multifunction apparatus 10 and a head control board (not shown) for the recording head 39. The flat cable 85 is a thin band-shaped member formed such that a plurality of electrical wires for transferring electrical signals are coated with synthetic resin such as polyester for insulation.

The flat cable 85 has a flexibility such that the flat cable 85 bends or deforms following the carriage 38 moving or reciprocating, or in accordance with a reciprocating movement of the carriage 38. A portion of the flat cable 85 between the carriage 38 and the clip 36 generally has a U-like shape as seen in the plan view of FIG. 3. The portion of the flat cable 85 between the carriage 38 and the clip 36 corresponds to a supported portion of the long member of the invention. The band-shaped flat cable 85 is oriented such that two opposite surfaces thereof vertically extend and a normal to the surfaces is horizontal. The direction in which the flat cable 85 extends from the carriage 38 is identical with the direction in which the ink tubes 41 extend from the carriage 38.

A first one of two opposite ends (which will be hereinafter referred to as the first end) of the flat cable 85 that is fixed to the carriage 38 as a fixing portion is electrically connected with the head control board (not shown) mounted on the carriage 38. Although not shown in FIGS. 3 and 4, a second end of the flat cable 85 that is fixed to the clip 36 as another fixing portion is electrically connected with the main board, i.e., the control board of the multifunction apparatus 10. Like the ink tubes 41, the portion of the flat cable 85 bent or curved in the generally U-like shape is not fixed to any members, and changes its form or position or attitude following the carriage 38 moving or reciprocating, or in accordance with a reciprocating movement of the carriage 38.

Guide 70

As shown in FIGS. 3 and 4, on the front side of the ink tubes 41 and the flat cable 85, a guide 70 extends in the lateral direction of the multifunction apparatus 10, i.e., the direction of arrow 101. The guide 70 is a wall member having a wall surface extending vertically or in the direction of arrow 102 indicated in FIG. 1, and the ink tubes 41 contact the wall surface. Roughly speaking, the guide 70 extends in the direction of extension of the ink tubes 41 from a first position around the clip 36 fixing the ink tubes 41, to a second position near an internal side surface of the printer portion 11. The wall surface of the guide 70 has a height such that all of the four ink tubes 4 as arranged vertically (i.e., in the direction of arrow 102 indicated in FIG. 1) by means of the clip 36 can contact the wall surface.

Figure 11:
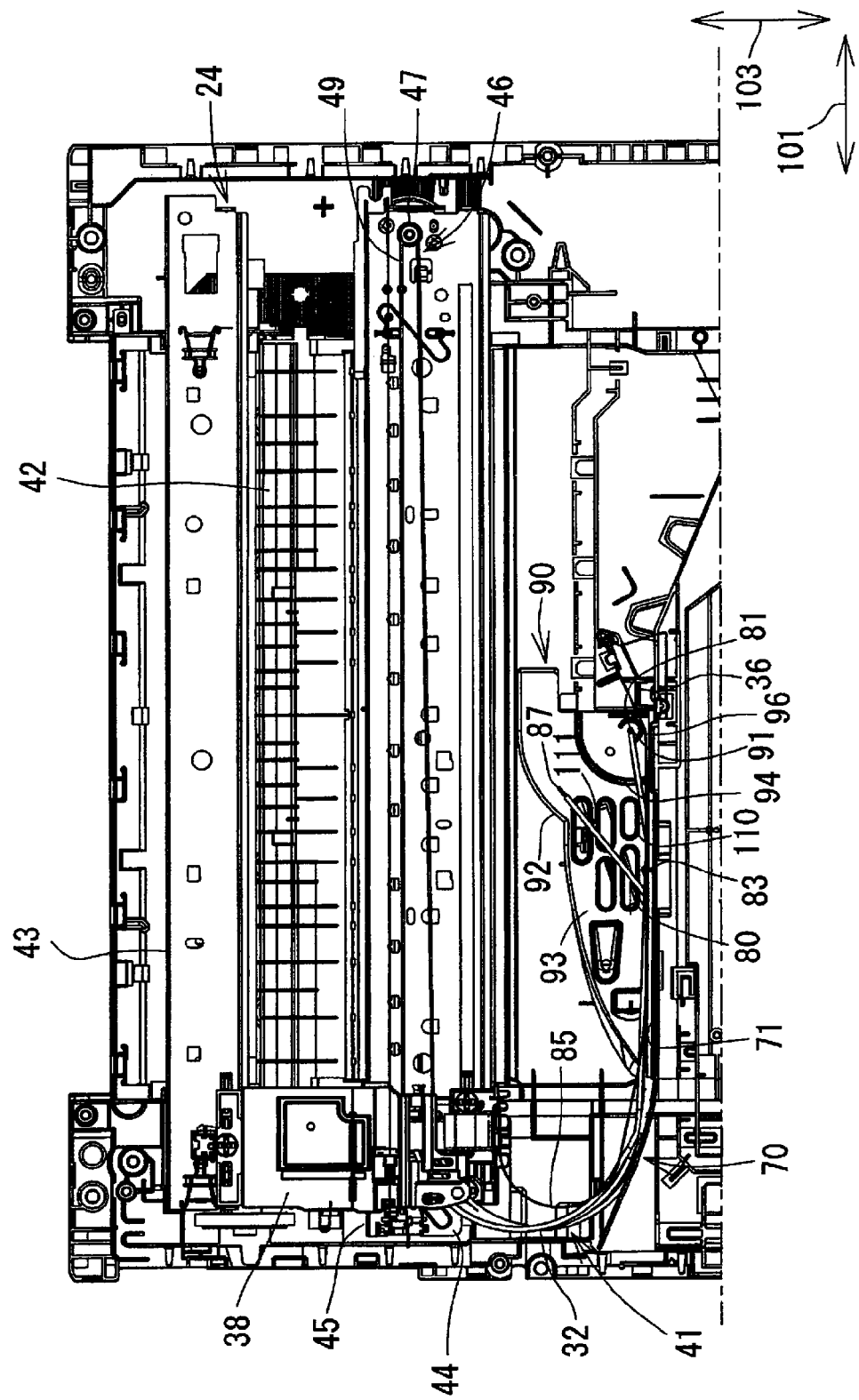
FIG. 11 is a plan view of the image recording unit and its vicinity in a state where the carriage is at a left end of its range of reciprocation.

The one of two opposite wall surfaces of the guide 70 that is on the side of the ink tubes 41 functions as a guide surface 71, with which the ink tubes 41 can contact. As described above, the ink tubes 41 change their forms or attitudes in accordance with a reciprocating movement of the carriage 38. When the carriage 38 moves to the left end of the range of reciprocation thereof, a part of the ink tubes 41 comes into contact with the guide surface 71, as shown in FIG. 11.

Guide Wire 80

Figure 5:
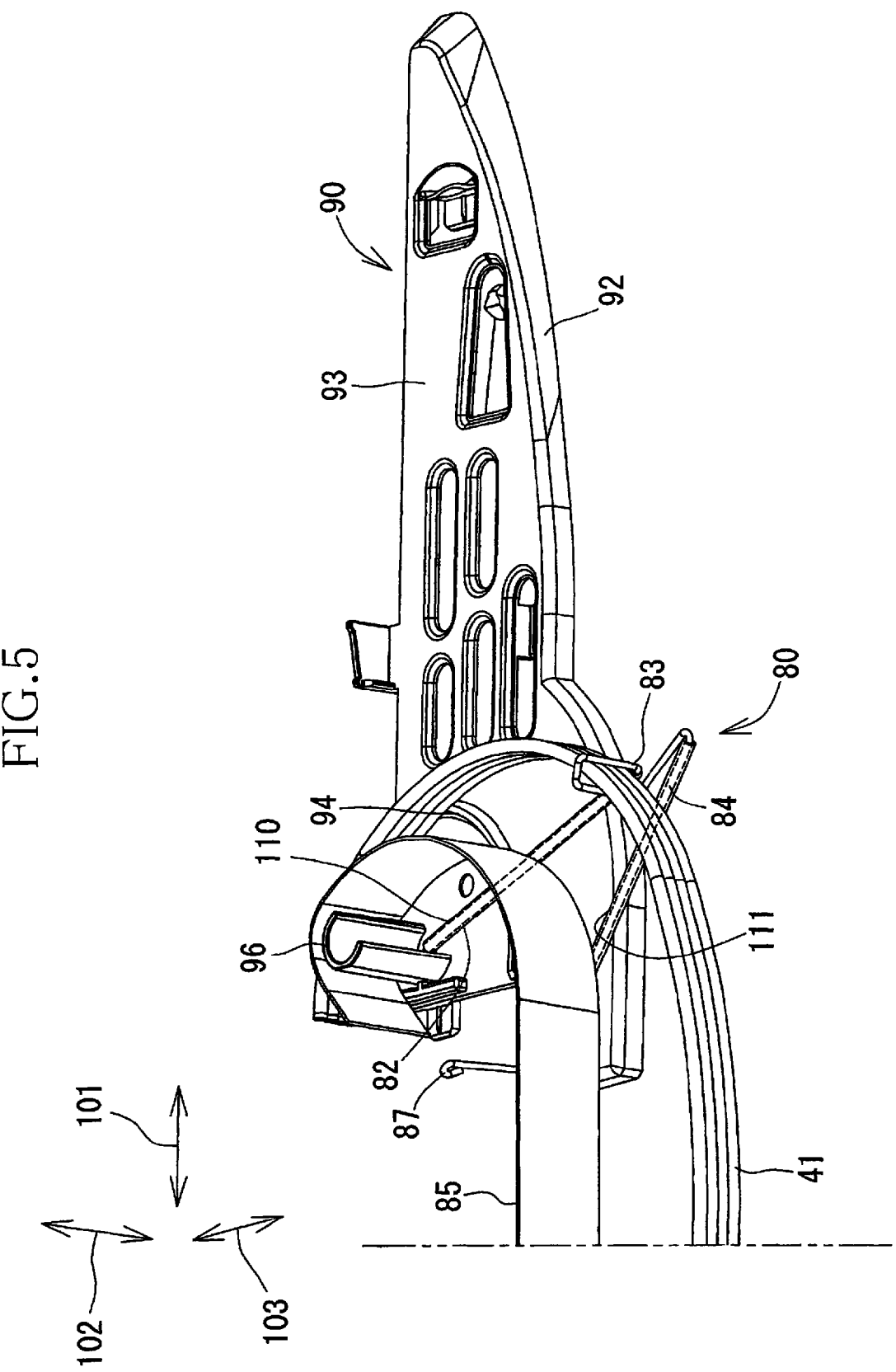
FIG. 5 is a perspective view of a guide wire and a base plate in the multifunction apparatus.
Figure 6:
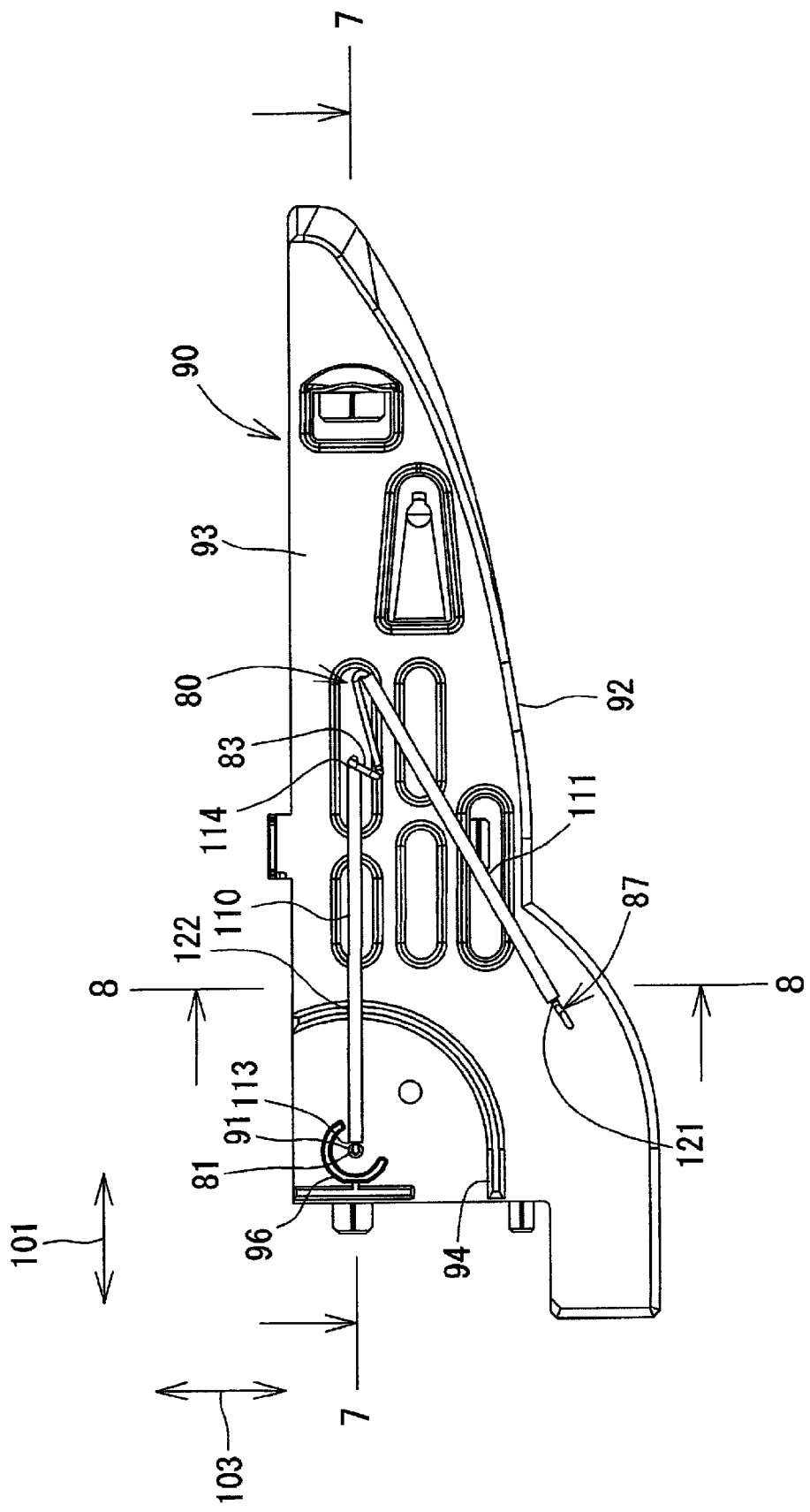
FIG. 6 is a plan view of the guide wire and the base plate.
Figure 7:
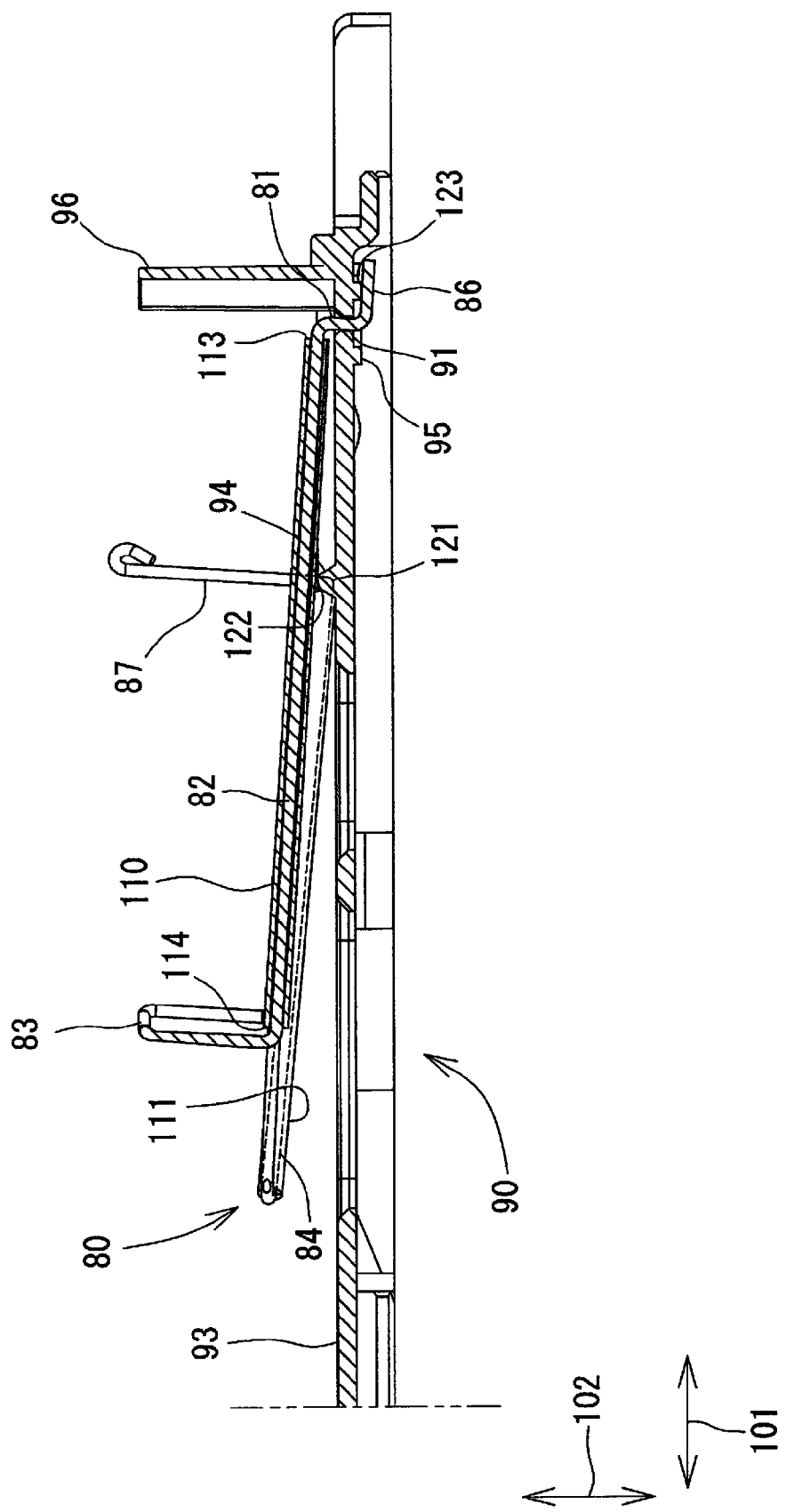
FIG. 7 is a fragmentary sectional view taken along line 7-7 in FIG. 6.

As shown in FIGS. 5-7, the guide wire 80 includes a pivotal portion 81 around which the guide wire 80 turns, a first arm 82, a tube holding portion 83, and a second arm 84. The guide wire 80 is formed of a steel wire material that is bent by wire forming. The first arm 82 horizontally extends from the pivotal portion 81, and the tube holding portion 83 is disposed in an end portion of the first arm 82 on the side remote from the pivotal portion 81. The second arm 84 is formed by bending a portion of the steel wire material remote from the pivotal portion 81 at an acute angle. Since in the present embodiment an entirety of the guide wire 80 is formed of a steel wire material, the entirety of the guide wire 80 constitutes a linear material portion of the support member of the invention. However, in a case where only the first arm 82, the tube holding portion 83, and the second arm 84 are formed of a steel wire material, these portions 82, 83, 84 constitute the linear material portion of the invention.

The pivotal portion 81 is formed by bending the steel wire material substantially such that the pivotal portion 81 is substantially perpendicular to the first arm 82. A third arm 86 extends from an end of the pivotal portion 81 in a direction parallel to and opposite to a direction of extension of the first arm 82. An end portion of the guide wire 80 where the pivotal portion 81 is formed corresponds to a first end of the linear material portion. The guide wire 80 is attached to a base plate 90 fixed on the main body 37. More specifically, a pivot hole is formed in the base plate 90, and the wire material forming the guide wire 80 is inserted from the side of the third arm 86 into the pivot hole 91 from the upper side of the base plate 90 through to the under side thereof so as to accommodate the pivotal portion 81 in the pivot hole 91. When the guide wire 80 is thus assembled with the base plate 90, the guide wire 80 is supported to be turnable relative to the base plate 90 and around an axis at the axial portion 81 extending substantially vertically (i.e., in the direction of arrow 102) in the pivotal hole 91, with the first arm 82 extending substantially horizontally. The pivotal portion 81 corresponds to the first end of the linear material portion.

Each of the first and second arms 82, 84 extends substantially horizontally, and has a protective tube 110, 111 fitted thereon. The protective tube 110, 111 corresponds to a tubular member of the invention. Via the protective tubes 110, 111, the first arm 82 and the second arm 84 support the portion (corresponding to the supported portion of the long member of the invention) of the flat cable 85 whose form or attitude changes in accordance with a reciprocating movement of the carriage 38. That is, the flat cable 85 is supported by the guide wire 80 at two places different in the direction of extension of the guide wire 80.

The tube holding portion 83 formed in an end portion of the first arm 82 holds the ink tubes 41. That is, the tube holding portion 83 has a rectangular annular shape vertically long, defining a rectangular hole inside thereof. The vertically arranged ink tubes 41 are inserted through the rectangular hole to be held thereby. Outer diameters of the ink tubes 41 and inside dimensions of the annular tube holding portion 83, i.e., the width and height of the hole defined inside the tube holding portion 83, are in a relationship such that the vertical arrangement of the ink tubes 41 is not broken inside the hole of the tube holding portion 83, as well as the ink tubes 41 are allowed to freely slide in the direction of extension thereof. The tube holding portion 83 is formed such that the steel wire material forming the guide wire 80 is bent to stand from the first arm 82 to form the rectangular annular shape vertically long. The rest of the steel wire material, namely, a part of the steel wire material between the tube holding portion 83 and an end of the steel wire material opposite to the end portion where the pivotal portion 81 is disposed, has two segments, a first one of which extends from the tube holding portion 83 in a direction substantially the same with the extending direction of the first arm 82, and a second one of which extends from an end of the first segment opposite to the tube holding portion 83 to form an acute angle with the first segment. The first segment corresponds to a part of the first arm 82, and the second segment corresponds to the second arm 84.

The positions in the directions of arrows 101, 102, 103 where the tube holding portion 83 holds the ink tubes 41 are adjusted depending on how the forms or attitudes of the ink tubes 41 change. The four ink tubes 41 held by the tube holding portion 83 are slidable relative to the tube holding portion 83 when the forms or attitudes of the ink tubes change in accordance with a reciprocating movement of the carriage 38.

The second arm 84 extends in a direction such that the first and second arms 82, 84 form therebetween an acute angle 84. This acute angle is not specifically limited but is determined taking account of the lengths of the ink tubes 41 and the flat cable 85. The length of the second arm 84 is smaller than that of the first arm 82. At an end portion of the second arm 84 remote from the tube holding portion 83, the wire material is bent upward, with an extreme end bent downward to the side opposite to the position where the first and second arms 82, 84 form the acute angle, thereby forming a retaining portion 87 in an arcuate or hook-like shape. The vertical dimension of the retaining portion 87 is larger than the width (i.e., the dimension in the direction of arrow 102) of the band-shaped flexible flat cable 85. The retaining portion 87 functions to prevent the flat cable 85 supported on the guide wire 80 from dropping off of the guide wire 80 at an end of the second arm 84 remote from the position where the first and second arms 82, 84 form the acute angle.

A lower end of the retaining portion 87 is positioned below a lowermost portion of the first arm 82, as shown in FIG. 7. That is, both the first and second arms 82, 84 extend substantially horizontally, and the second arm 84 extends from the first arm 82 in a direction forming the acute angle with the first arm 82 in plan view, but inclining downward in side view. Hence, when the guide wire 80 is assembled with the base plate 90, the lower end of the retaining portion 87 is located slightly below the lowermost portion of the first arm 82.

Both the protective tubes 110, 111 are formed of a flexible synthetic resin, which is typically polyethylene or polypropylene, and are transparent or almost transparent. The protective tubes 110, 111 are similar in their shapes but different in their lengths. That is, the lengths of the protective tubes 110, 111 correspond to the lengths of the arms 82, 84 on which the protective tubes 110, 111 are respectively fitted or attached. Hence, a detailed description of only the protective tube 110 will be provided and that of the protective tube 111 is omitted.

Figure 8:
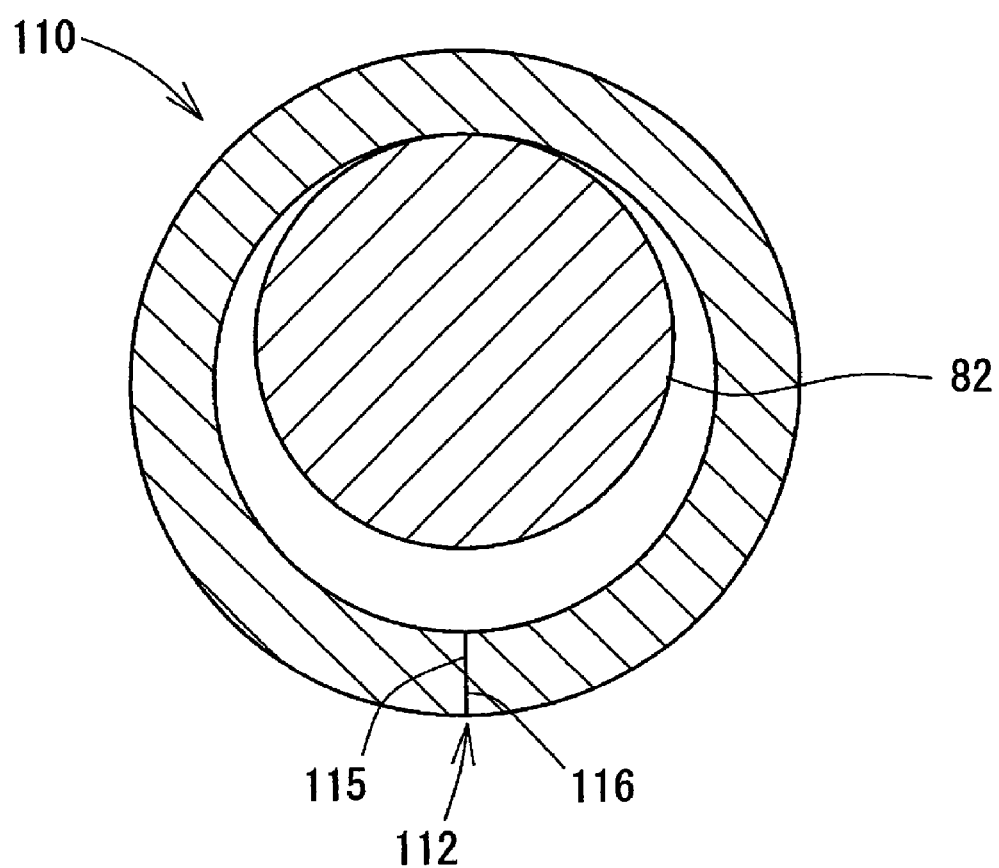
FIG. 8 is a fragmentary sectional view along line 8-8 in FIG. 6, showing a state where two cut surfaces are in contact with each other.

As shown in FIG. 8, the protective tube 110 is a cylindrical tube having a length corresponding to a length of a part of the first arm 82 between the pivotal portion 81 and the tube holding portion 83. When the protective tube 110 is fitted on the first arm 82, almost the entire first arm 82, i.e., the part between the pivotal portion 81 and the tube holding portion 83, is covered with the protective tube 110. Since an internal diameter of the protective tube 110 is larger than an outer diameter of the first arm 82, there is a clearance between an inner circumferential surface of the protective tube 110 and an outer circumferential surface of the first arm 82, whereby the protective tube 110 is rotatable about an axis thereof and relative to the first arm 82.

The protective tube 110 has a cut 112 made in a radial direction of the protective tube 110, across the full thickness of the wall of the protective tube 110. That is, the depth of the cut 112 corresponds to a dimension between the inner and outer circumferential surfaces of the protective tube 110. The cut 112 extends across the whole axial length of the protective tube 110, or between a first end 113 and a second end 114 of the tube 110 in FIG. 7. A pair of surfaces 115, 116, which will be hereinafter referred to as "cut surfaces 115, 116", are on the opposite sides of an opening or clearance of the cut 112 to define the opening of the cut 112, although the opening can disappear or the cut 112 can be closed with the surfaces 115, 116 in contact with each other. The cut surfaces 115, 116 are colored, for instance in red or blue, in order to make the cut surfaces 115, 116 easy to find or distinguishable from the other part of the protective tube 110.

Figure 9:
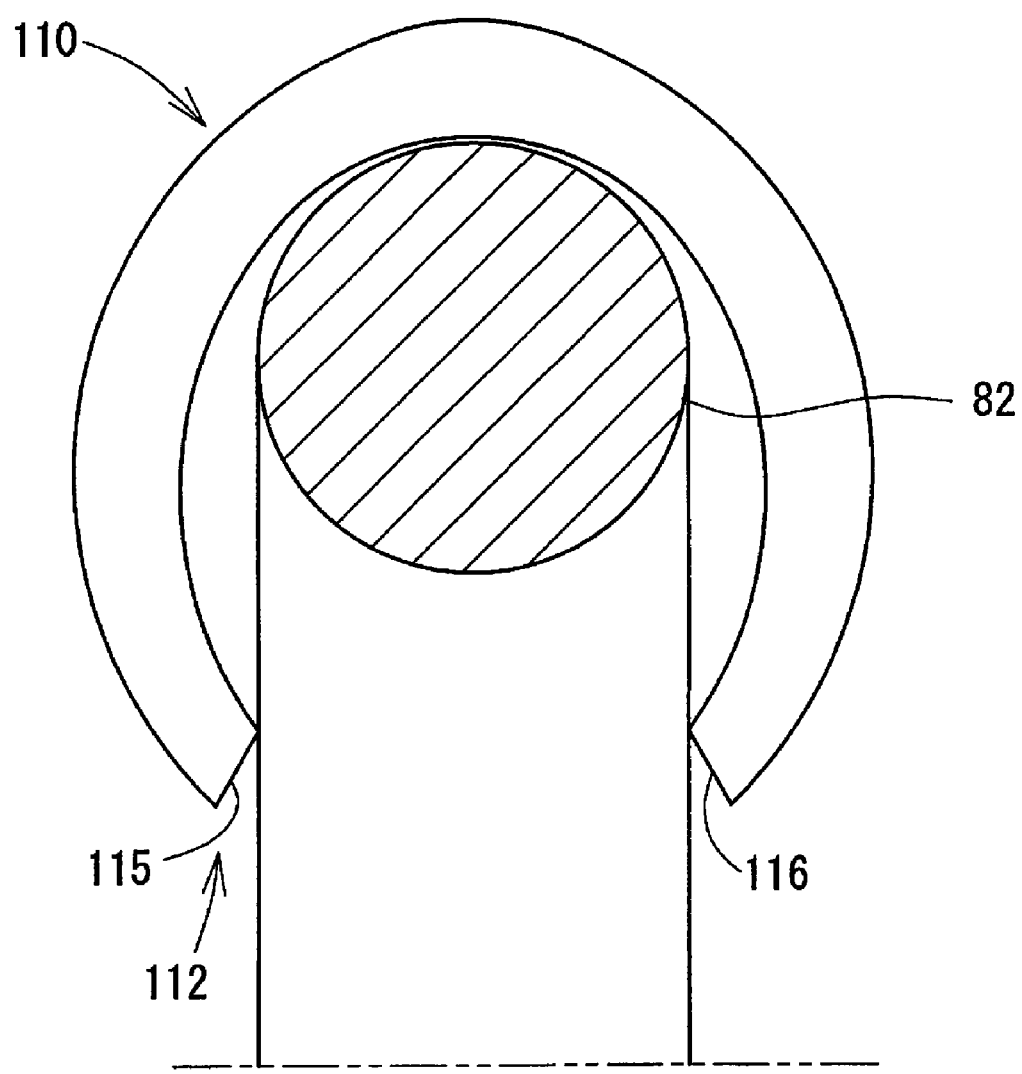
FIG. 9 is a fragmentary sectional view along line 8-8 in FIG. 6, showing a state where the two cut surfaces are separated from each other.

The protective tube 110 is elastically deformable in order to allow the cut 112 to open. The cut 112 can open to such a degree that the size of the opening or clearance, or the distance between the cut surfaces 115, 116, becomes larger than the outer diameter of the first arm 82 of the guide wire 80. Thus, it is possible to open a portion of the cut 112, or to form an opening between the cut surfaces 115, 116 at a place of the cut 112, by elastically deforming the protective tube 110, and insert the first arm 82 into a bore of the protective tube 110 through the opening, as shown in FIG. 9. In assembling, the first arm 82 is pushed into the protective tube 110 through the opening sequentially along the cut 112, starting from one of the first and second ends 113, 114 and ending at the other end 113, 114. When a part of the first arm 82 is inserted in the protective tube 110, the rest of the first arm 82 is located outside the protective tube 110 and the first arm 82 is interposed between the cut surfaces 115, 116. At a position where the first arm 82 is just inserted in the protective tube 110, the protective tube 110 elastically restores to its original form, closing the cut 112 or the opening or clearance between the cut surfaces 115, 116.

Base Plate 90

As shown in FIGS. 3 and 4, the base plate 90 is fixed to the main body 37 of the printer portion 11 on the rear side of the guide 70, i.e., on the side of the carriage 38 with respect to the guide 70. A dimension of the base plate 90 in the lateral direction of the multifunction apparatus 10 (i.e., the direction of arrow 101) is slightly smaller than a dimension of the guide 70 in the same direction, and a dimension of the base plate 90 in the depth or front-rear direction of the multifunction apparatus 10 (i.e., the direction of arrow 103) is equal to or smaller than a distance between the guide 70 and the guide rail 44.

As shown in FIGS. 6 and 7, the pivot hole 91 is formed to vertically (i.e., in the direction of arrow 102) extend through the thickness of the base plate 90 to rotatably hold or support the pivotal portion 81 of the guide wire 80. In plan view, the pivot hole 91 is located inside the U-like shapes of the ink tubes 41 and flat cable 85. The guide wire 80 is supported at the pivot hole 91 to be turnable around the axis at the pivotal portion 81 accommodated in the pivot hole 91. The first arm 82 substantially horizontally extends from the pivotal portion 81 toward the ink tubes 41 and the flat cable 85.

On the base plate 90, a distance between the pivot hole 91 and a rear edge of the base plate 90 is smaller than the length of the part of the first arm 82 between the pivotal portion 81 and the tube holding portion 83. Hence, when the guide wire 80 turns around the axis or its pivotal portion 81 while changing its attitude or position from a first position where the entirety of the first arm 82 including the tube holding portion 83 is located over an upper surface 93 of the base plate 90 to a second position where a part of the first arm 82 including the tube holding portion 83 is located outside the upper surface 93 of the base plate 90 in plan view.

On the base plate 90, the distance between the pivot hole 91 and a rear edge wall 92 of the base plate 90 is larger than a distance between the pivotal portion 81 and the retaining portion 87. The shape of the rear edge wall 92 in plan view, at least in an area corresponding to an entire range of turning of the retaining portion 87, may be anywise as long as the distance between the pivot hole 91 and the rear edge wall 92 is larger than the distance between the pivotal portion 81 and the retaining portion 87. The other part of the rear edge wall 92 that is outside the area corresponding to the range of turning of the retaining portion 87 and does not affect the turning of the retaining portion 87, and that includes a part on a right-hand portion of the base plate 90 as seen in FIGS. 5 and 6, may have any desired shape. Thus, wherever the guide wire 80 is located within its range of turning, the retaining portion 87 is always located over the upper surface 93 of the base plate 90, and the lower end of the retaining portion 87 is in contact with the upper surface 93. The lower end of the retaining portion 87 is a contact portion 121 at which the retaining portion 87 contacts the base plate 90.

As shown in FIGS. 5-7, on the upper surface 93 of the base plate 90 and around the pivot hole 91 is formed a first support rib 94 for supporting the first arm 82. The first support rib 94 has a circular or arcuate shape having a center at the pivot hole 91, and upward protrudes from the upper surface 93 of the base plate 90. The first support rib 94 extends to cover an entire range of turning of the first arm 82. That is, wherever the first arm 82 is located within the range of turning thereof, the first support rib 94 supports the first arm 82. A distance between the pivot hole 91 and the first support rib 94 is determined such that the first support rib 94 supports the first arm 82 but does not interfere with the second arm 84.

On an upper end of the first support rib 94 is supported the first arm 82 via the protective tube 110. That is, the first arm 82 and the protective tube 110 are supported on the first support rib 94. The protective tube 110 contacts at its contact portion 122 the upper end of the first support rib 94. When the first arm 82 turns across its range of turning, the position of the contact portion 122 of the protective tube 110 is invariant with respect to the axial direction of the protective tube 110, but is variable with respect to the circumferential direction of the protective tube 110, since the protective tube 110 rotates relative to and around the first arm 82, as described later. The height of the first support rib 94 is constant over a range corresponding to the entire range of turning of the first arm 82, and is determined such that the tube holding portion 83 of the guide wire 80 is held off the upper surface 93 of the base plate 90.

As shown in FIG. 7, on the under surface of the base plate 90 and around the pivot hole 91, a second support rib 95 for supporting the third arm 86 is formed. Similar to the first support rib 94, the second support rib 95 protrudes downward from the under surface of the base plate 90 in a circular or arcuate shape having a center at the pivot hole 91, although not shown in FIG. 7. The second support rib 95 is formed to cover an entire range of turning of the third arm 86 which turns with a turning movement of the first arm 82. That is, wherever the third arm 86 is located within the entire range of turning thereof, the second support rib 95 supports the third arm 86. The distance between the pivot hole 91 and the second support rib 95 is not specifically limited. However, a supporting force provided by the contact between the third arm 86 and the second support rib 95 to support the guide wire 80 on the base plate 90 increases with the distance between the pivot hole 91 and the second support rib 95. A lower end of the second support rib 95 is held in contact with the third arm 86, across the entire range of turning of the third arm 86. The second support rib 95 contacts the third arm 86 at a contact portion 123 on the third arm 86. When the third arm 86 turns across the entire range of turning of the third arm 86, the contact portion 123 is invariant with respect to the axial direction of the third arm 86. The height or vertical dimension of the second support rib 95 is constant over a range corresponding to the entire range of turning of the third arm 86, and is determined such that the tube holding portion 83 of the guide wire 80 is held off the upper surface of the base plate 90.

As described above, wherever the guide wire 80 is located within the entire range of turning thereof, the guide wire 80 is held in contact with the base plate 90 at three places. More specifically, the contact portion 121 of the retaining portion 87 is held in contact with the upper surface 93 of the base plate 90, the first arm 82 is held in contact with the first support rib 94 via the contact portion 122 of the protective tube 110, and the contact portion 123 of the third arm 86 is held in contact with the second support rib 95. With the guide wire 80 held in contact with the base plate 90 at the three places, the tube holding portion 83 of the guide wire 80 is held off or separated from the upper surface 93 of the base plate 90. In this way, across its entire range of turning, the guide wire 80 is supported on the base plate 90 by contact therebetween at three places.

As shown in FIGS. 5-7, around the pivot hole 91 of the base plate 90 and on the side of the carriage 38 with respect to the guide 70, a guide plate 96 stands with a spacing interval from the guide 70. The guide plate 96 has a generally cylindrical shape whose center line aligns with the pivot hole 91. The guide plate 96 has a cutout, and a dimension of a circumferential extension of the cutout corresponds to the range of turning of the guide wire 80, whereby turning of the guide wire 80 across the entire range of turning thereof is allowed. Hence, the first arm 82 extending from the pivot hole 91 can turn within a range corresponding to a circumferential dimension of the cutout. In other words, the cutout formed in the guide plate 96 delimits the range of turning of the guide wire 80.

Operations of the Carriage 38 and the Guide Wire 80

There will be described operations of the carriage 38 and the guide wire 80 in the printer portion 11. The carriage 38 with the recording head 39 mounted thereon receives a drive force from the motor via the belt drive mechanism 46, and reciprocates in the direction intersecting the feeding direction indicated by arrow 101, while guided by the guide rails 43, 44. When reciprocated with the carriage 38, the recording head 39 selectively ejects droplets of the color inks supplied from the ink tubes 41, onto a recording sheet over the platen 42, at predetermined timings and based on signals transferred through the flat cable 85 from the control board. A desired image is recorded on the recording sheet by alternately reiterating feeding of the recording sheet by the feeder roller 60 and the ejection roller 62 and reciprocation of the carriage 38. The carriage 38 is operated not only when an image is recorded, but also when a maintenance operation and an initializing operation are performed.

The ink tubes 41 and the flat cable 85 both connected with the carriage 38 change their forms or attitudes in accordance with the reciprocating movement of the carriage 38. With the change in the forms or attitudes of the ink tubes 41, the guide wire 80 turns. While turning, the guide wire 80 supports the ink tubes 41 and the flat cable 85 that are changing their forms or attitudes in accordance with the reciprocating movement of the carriage 38.

Figure 10:
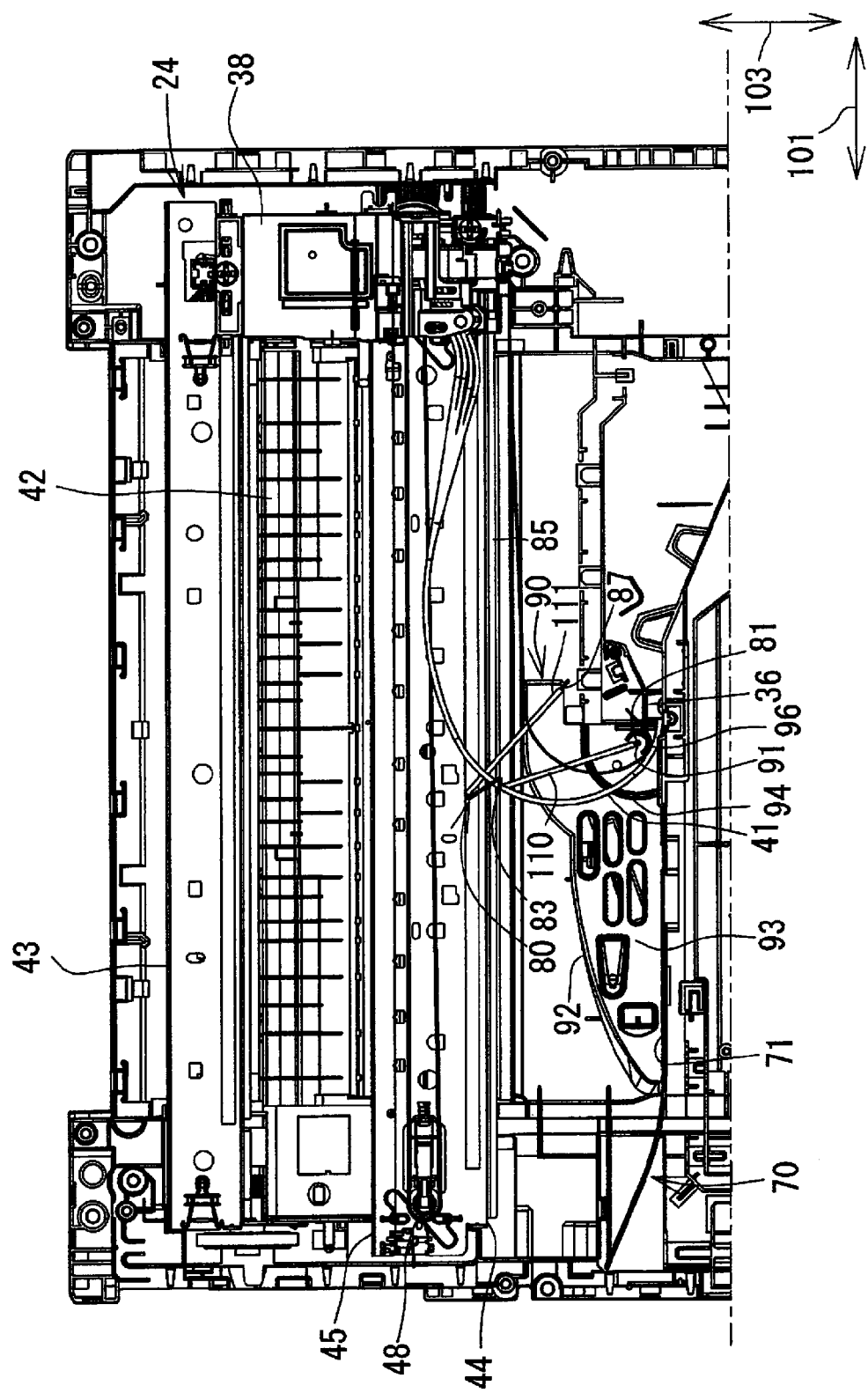
FIG. 10 is a plan view of the image recording unit and its vicinity in a state where a carriage is at a right end of its range of reciprocation.

As shown in FIG. 10, when the carriage 38 moves toward the right end of its range of reciprocation, the ink tubes 41 and the flat cable 85 are shaped into a shape substantially U-like and curving from a position just at the side of the clip 36. Since the ink tubes 41 are inserted through the tube holding portion 83 of the guide wire 80 and the tube holding portion 83 receives a force from the ink tubes 41 changing their forms or attitudes, the guide wire 80 turns around its pivotal portion 81 with the tube holding portion 83 moving in a direction parallel to the direction of the movement of the carriage 38, i.e., rightward as seen in FIG. 10. During this turning of the guide wire 80, the ink tubes 41 are supported by the tube holding portion 83 and the first and second arms 82, 84, and the flat cable 85 is supported by or on the first and second arms 82, 84.

As shown in FIG. 11, when the carriage 38 moves toward the left end of its range of reciprocation from the position shown in FIG. 10, the ink tubes 41 and the flat cable 85 change their forms or attitudes in accordance with the reciprocating movement of the carriage 38 such that the radii of the curves of the substantially U-like shapes of the ink tubes 41 and flat cable 85 decrease. The guide wire 80 turns around the pivotal portion 81 since the tube holding portion 83 receives a force from the ink tubes 41 changing their forms or attitudes and moves in the direction of the movement of the carriage 38, i.e., leftward as seen in FIG. 11. During this turning of the guide wire 80, too, the ink tubes 41 are supported by the tube holding portion 83 and the first and second arms 82, 84, and the flat cable 85 is supported by or on the first and second arms 82, 84.

When the guide wire 80 is turned by the change in the forms or attitudes of the ink tubes 41 and the flat cable 85, the ink tubes 41 and the flat cable 85 move or slide on the first and second arms 82, 84. As described above, the ink tubes 41 and the flat cable 85 are supported by the first and second arms 82, 84 via the protective tubes 110, 111 which are freely rotatable around and relative to the respectively corresponding arms 82, 84. Hence, when the ink tubes 41 and the flat cable 85 move on the first and second arms 82, 84, the protective tubes 110, 111 in direct contact with the first and second arms 82, 84 rotate. That is, the ink tubes 41 and the flat cable 85 do not directly contact the first and second arms 82, 84 when sliding on the arms 82, 84.

When the flat cable 85 changes its form or attitude in accordance with the reciprocating movement of the carriage

38, a supporting place on the second arm 84 at which the second arm 84 supports the flat cable 85 draws an arcuate path, assuming that the flat cable 85 does not slide on the second arm 84 while changing its form or attitude. If the protective tube 111 is not provided, an excessive load may be imposed on the supporting place on the second arm 84 when the flat cable 85 changes its form or attitude. According to the embodiment where the protective tube 111 is provided, the protective tube 111 rotates in order to allow the flat cable 85 to smoothly slide or move on the second arm 84 as well as the risk of the excessive load imposed on the flat cable 85 is eliminated.

As described above, the first support rib 94 supporting the first arm 82 is formed around the pivot hole 91 of the base plate 90, and the first arm 82 is supported on the first support rib 94 via the protective tube 110. When the first arm 82 moves or slides on the first support rib 94, the protective tube 110 rotates relative to the first arm 82. That is, the first arm 82 does not directly contact the first support rib 94 when sliding thereon. Further, since the first arm 82 is held off the upper surface 93 of the base plate 90, it is prevented, when the guide wire 80 slides, that the first arm 82 slides on the upper surface 93 of the base plate 90 in direct contact therewith and that the tube holding portion 83 impinges on the rear edge wall 92 of the base plate 90.

Operation and Effects of the Embodiment

According to the printer portion 11, the protective tubes 110, 111 are fitted on the first and second arms 82, 84 of the guide wire 80, respectively, and the flat cable 85 is supported by the first and second arms 82, 84 via the protective tubes 110, 111. Thus, it is enabled to support the flat cable 85 by the guide wire 80 having a relatively high rigidity, while it is prevented that the flat cable 85 directly contacts the first and second arms 82, 84. This reduces problems or inconveniences caused by sliding of the flat cable 85 on the guide wire 80, such as wearing of the flat cable 85 by contact with the guide wire 80, and sliding noise or friction noise occurring between the guide wire 80 and the flat cable 85.

Since the protective tube 110 is fitted on the first arm 82 of the guide wire 80 such that the protective tube 110 is rotatable relative to the first arm 82, the protective tube 110 moves with the guide wire 80 by rotating on or in contact with the first support rib 94 on the base plate 90. By this arrangement, the first arm 82 is smoothly turned or moved relative to the first support rib 94 of the base plate 90. In addition, since the protective tube 111 is rotatable relative to and around the second arm 84 of the guide wire 80 when the flat cable 85 moves or slides on the second arm 84, the flat cable 85 can smoothly move or slide on the second arm 84, thereby further reducing the wear of the flat cable 85 and the sliding or friction noise.

Each of the protective tubes 110, 111 has the cut 112 formed through the thickness of the wall thereof to axially extend over the entire axial length thereof, i.e., from one of two opposite ends (113) thereof to the other (114) end, a part of each of the first arm 82 and the second arm 84 of the guide wire 80 can be pushed into the bore of the corresponding protective tube 110, 111 by slightly opening the cut 112. Hence, even though the guide wire 80 has bends, the protective tubes 110, 111 can be easily fitted or attached on the guide wire 80.

In particular, in the case where the guide wire 80 is formed of a steel wire material by wire forming, as in the present embodiment, it is typical that a heat treatment is performed on the guide wire 80 in order to maintain the shape of the steel wire material as having been bent. When the protective tubes 110, 111 formed of a flexible synthetic resin are used as in the embodiment, it is preferable that the heat treatment is performed after the wire material is bent by wire forming and before the protective tubes 110, 111 are attached or fitted on the wire material, in view of the heat resistance of the protective tubes 110, 111. As described above, the cuts 112 formed in the protective tubes 110, 111 make it easy to attach or fit the protective tubes 110, 111 at desired places on the guide wire 80 having bends.

Since the guide wire 80 is formed by bending a single steel wire material, it is easy to support the flat cable 85 at a plurality of places (that are the first and second arms 82, 84 in the embodiment) on the guide wire 80. In particular, where the range of reciprocation of the carriage 38 is relatively wide corresponding to a width of a relatively wide recording sheet and the flat cable 85 is accordingly long, this effect is especially significant.

In the embodiment, the guide wire 80 formed of a steel wire material constitutes the support member of the invention. However, a linear material formed of a substance that is not a metal may constitute the support member, as long as the functions of the guide wire 80 can be obtained.

Since the protective tubes 110, 111 have a translucency and the cut surfaces 115, 116 at the cut 112 of each protective tube 110, 111 are colored, the cut surfaces 115, 116 can be seen from any angle, thereby making it easy to find the cut 112.

It is noted that the coloring the cut surfaces 115, 116 as described above is preferable but not essential. That is, even where the cut surfaces 115, 116 are not colored, the cut 112 is still easily findable, for the following reasons. That is, since the inside of the protective tubes 110, 111 having a translucency is seeable from the outside and the refractive index of light differs at the cut surfaces 115, 116 from the other part of the protective tubes 110, 111, the cut surfaces 115, 116 of the cut 112 are seen as being clouded.

The guide wire 80 is supported such that three contact portions 121, 122, 123 thereof are in contact with the base plate 90. These three contact portions 121, 122, 123 are not located on a straight line. Hence, even when the flat cable 85 moves or slides on the first arm 82 or the second arm 84 while the guide wire 80 turns, the attitude of the guide wire 80 is stably maintained. Thus, during turning of the guide wire 80, the attitude of the guide wire 80 is not affected by its dimensional accuracy and thermal or secular deformation, thereby reducing occurrence of noise due to turning of the guide wire 80.

In the embodiment, the guide wire 80 constituting the support member is supported on the base plate 90 constituting a base member by contact at three places, namely, the contact portions 121, 122, 123. However, the number of places at which the support member contacts the base member may be three or more.

Although in the embodiment the flat cable 85 constitutes the long member of the invention, the long member is not limited to a flat cable but may be other tubular or band-shaped members. For instance, the ink tubes 41 may constitute the long member.

Although in the embodiment the movement apparatus of the invention takes the form of a part of the printer portion 11, the movement apparatus may be embodied as a part of an image scanner. In the case where the movement apparatus is embodied as a part of an image scanner, the movable body and the long member may respectively take the forms of a carriage on which an image sensor is mounted, and an electric cable through which electrical signals are transferred between the image sensor and a main board of the image scanner, for instance.

It is to be understood that the multifunction apparatus has been described as one example of an image recording apparatus including a movement apparatus according to the invention, and the invention is not limited thereto but may be otherwise embodied with various modifications and improvements that may occur to those skilled in the art, without departing from the scope and spirit of the invention defined in the appended claims.

What is claimed is:

1. A movement apparatus comprising:
a movable body which reciprocates along a straight line;
a flexible long member having two opposite ends a first one of which is fixed to the movable body and a second one of which is fixed to a stationary member, the form of the long member changing in accordance with a reciprocating movement of the movable body relative to the stationary member;
a support member which has a linear material portion at which the support member supports the long member; and
a tubular member fitted on the linear material portion.

2. The movement apparatus according to claim 1, wherein the linear material portion has a straight portion, and the tubular member is fitted on the straight portion such that the tubular member is rotatable relative to the straight portion.

3. The movement apparatus according to claim 2, wherein the change of the form of the long member in accordance with the reciprocating movement of the movable body is along a plane, the movement apparatus further comprising a holding device which holds the support member such that the support member can turn around an axis perpendicular to the plane.

4. The movement apparatus according to claim 3, wherein the holding device has a supporting portion which supports the linear material portion via the tubular member.

5. The movement apparatus according to claim 3, wherein the straight portion extends in a direction such that with respect to an entire range of reciprocation of the movable body, irrespective of changes in the form of the long member and turns of the straight portion around the axis when the movable body reciprocates, a slippage between the tubular member and the long member is less where the tubular member rotates relative to the straight portion than where the tubular member does not rotate relative to the straight portion.

6. The movement apparatus according to claim 1, wherein the linear material portion is formed of a metal, and the tubular member is formed of a synthetic resin.

7. The movement apparatus according to claim 1, wherein there is a cut made from an outer circumferential surface of the tubular member to an inner circumferential surface thereof across an entire length of the tubular member, the cut being openable with an elastic deformation of the tubular member.

8. The movement apparatus according to claim 1, wherein the linear material portion has a bent shape such that the linear material portion supports the long member at a plurality of places on the linear material portion.

9. The movement apparatus according to claim 2, wherein in addition to the straight portion as a first straight portion, the support member has a second straight portion, the movement apparatus further comprising a second tubular member fitted on the second straight portion such that the second tubular member is rotatable relative to the second straight portion, and the first tubular member and the second tubular member being discrete members.

10. The movement apparatus according to claim 9,
wherein the change of the form of the long member in accordance with the reciprocating movement of the movable body is along a plane,
and wherein the movement apparatus further comprises a holding device which holds the support member such that the support member can turn around an axis perpendicular to the plane, the holding device including a base member which has a support rib formed along an arc having a center at the axis around which the support member turns, the support rib supporting the second straight portion via the second tubular member.

11. The movement apparatus according to claim 10, wherein the holding device holds the support member by contacting the support member at at least three places thereon which are not located on a straight line.

12. The movement apparatus according to claim 3, wherein the holding device holds the support member by contacting the support member at at least three places thereon which are not located on a straight line.

13. A movement apparatus comprising:
a movable body which reciprocates along a straight line;
a flexible long member having two opposite ends a first one of which is fixed to the movable body and a second one of which is fixed to a stationary member, the form of the long member changing in accordance with a reciprocating movement of the movable body relative to the stationary member;
a support member which has a linear material portion;
a tubular member fitted on the linear material portion; and
a holding device which holds the support member such that the support member can turn around an axis, the holding device supporting the linear material portion via the tubular member.

14. The movement apparatus according to claim 13,
wherein the linear material portion has a straight portion, and the tubular member is fitted on the straight portion such that the tubular member is rotatable relative to the straight portion,
and wherein the holding device has a support rib which is formed along an arc having a center at the axis around which the support member turns, the support rib supporting the straight portion via the tubular member.

15. The movement apparatus according to claim 14, wherein the long member is supported by the linear material portion via the tubular member.

16. The movement apparatus according to claim 1, wherein the movable body comprises a carriage holding a recording head and moving with the recording head, and the long member comprises at least one of (i) an electric cable through which a signal representative of an instruction on recording is sent to the recording head, and (ii) an ink tube through which ink is supplied to the recording head.

17. An image recording apparatus comprising:
the movement apparatus according to claim 16; and
a medium feeding device which feeds a recording medium in a direction perpendicular to the direction of the reciprocation of the movable body,
the image recording apparatus having the recording head eject droplets of the ink onto the recording medium in order to record an image on the recording medium.

18. The movement apparatus according to claim 1, wherein the long member includes at least one of a flat cable and ink tubes.

19. The movement apparatus according to claim 1, wherein the tubular member is a cylindrical tube.

* * * * *